US00RE40449E

(19) United States
(12) Reissued Patent
Provitola et al.

(10) Patent Number: US RE40,449 E
(45) Date of Reissued Patent: Aug. 5, 2008

(54) AUTO-VERIFYING VOTING SYSTEM AND VOTING METHOD

(76) Inventors: Anthony I. Provitola, P.O. Box 2855, DeLand, FL (US) 32721-2855; Michael R. McDermott, P.O. Box 2855, DeLand, FL (US) 32721-2855

(21) Appl. No.: 11/062,351

(22) Filed: Feb. 14, 2005

(Under 37 CFR 1.47)

Related U.S. Patent Documents

Reissue of:
(64) Patent No.: 6,769,613
Issued: Aug. 3, 2004
Appl. No.: 09/732,324
Filed: Dec. 7, 2000

(51) Int. Cl.
*G06K 17/00* (2006.01)
*G06F 11/00* (2006.01)

(52) U.S. Cl. ..... 235/386; 235/51; 705/12
(58) Field of Classification Search ..... 235/50, 235/51, 56, 57, 375, 386; 705/12
See application file for complete search history.

(56) References Cited

U.S. PATENT DOCUMENTS

| | | | | |
|---|---|---|---|---|
| 4,641,240 | A | 2/1987 | Boram | |
| 5,585,612 | A | 12/1996 | Harp | |
| 6,081,793 | A | 6/2000 | Challener | |
| 6,250,548 | B1 | 6/2001 | McClure | |
| 6,581,824 | B1 | 6/2003 | McClure | |
| 6,641,033 | B2 | 11/2003 | Lohry et al. | |
| 7,036,730 | B2 * | 5/2006 | Chung | 235/386 |
| 2002/0066780 | A1 * | 6/2002 | Balolia | 235/51 |
| 2002/0078358 | A1 * | 6/2002 | Neff et al. | 713/176 |
| 2002/0084325 | A1 * | 7/2002 | Reardon | 235/386 |
| 2002/0084352 | A1 | 7/2002 | Reardon | |
| 2003/0006282 | A1 | 1/2003 | Vedura et al. | |
| 2003/0062411 | A1 | 4/2003 | Chung et al. | |
| 2003/0068872 | A1 * | 4/2003 | McClure et al. | 235/51 |
| 2004/0046021 | A1 * | 3/2004 | Chung | 235/386 |

OTHER PUBLICATIONS

Rebecca Mercuri, "A Better Ballot Box?," IEEE Spectrum, vol. 39, No. 10, Oct. 2002, U. S. A.
Rebecca Mercuri, "Voting Automation (Early and Often?)," Inside Risks, Communications of the Association for Computing Machinery, vol. 43, No. 11, Nov. 2000, U. S. A.
Rebecca Mercuri, "Corrupted Polling," Inside Risks, Communications of the Association for Computing Machinery, vol. 36, No. 11, Nov. 1993, U. S. A.
Rebecca Mercuri, "Electronic Voting", (from www.notable-software.com copyrighted 2000–2005), Updated Sep. 2005, U. S. A.
Rebecca Mercuri, "The Business of Elections," 3rd Conference on Computers, Freedom and Privacy, Mar. 1993, U. S. A.
Rebecca Mercuri, "Voting–Machine Risks," Inside Risks, Communications of the Association for Computing Machinery, vol. 35, No. 11, Nov. 1992, U. S. A.

(Continued)

*Primary Examiner*—Steven S. Paik
*Assistant Examiner*—April A Taylor

(57) ABSTRACT

A voting system provides for a computer-prepared and computer-printed election ballot generated by input from the voter, and provides for auto-verification whereby the voter has the opportunity and the responsibility to inspect the computer-printed ballot with his or her votes. The voting system also provides for correction of the votes of the voter in the computer station and correction of the votes of the voter shown on the printed ballot if such votes are not shown on the printed ballot as intended by the voter. Ultimately, the voter is presented with a printed ballot prepared by the voting station and its connected printer which accurately presents the votes of the voter for submission by the voter for final tabulation.

94 Claims, 3 Drawing Sheets

OTHER PUBLICATIONS

Michael Stanton (Translator), Agëncia O Estado de São Paulo, "The Importance of Recounting Votes", (on website http://www.estadao.com.br/technologia/), Nov. 2000, Brazil.

Ted Selker and Sharon Cohen, Caltech/Mit Voting Technology Project, "An Active Approach to Voting Verification", VIP Working Paper #28, May 2005, U. S. A.

Rebecca Mercuri, "Electronic Vote Tabulation Checks & Balances", Ph.D. Dissertation Defense, University of Pennsylvania, Oct. 2000, U. S. A.

Rebecca Mercuri, "Statement on Electronic Voting", (from www.notablesoftware.com), Copyright 2001, U. S. A.

Rebecca T. Mercuri, "Physical Verifiability of Computer Systems, "5th International Computer Virus and Security Conference, Mar. 1992, U. S. A.

United States of America 108th Congress, 1st Session, H. R. 2239, A Bill, "Voter Confidence and Increased Accessibility Act of 2003", Section 4.

* cited by examiner

AUTO-VERIFYING VOTING SYSTEM AND VOTING METHOD

Matter enclosed in heavy brackets [ ] appears in the original patent but forms no part of this reissue specification; matter printed in italics indicates the additions made by reissue.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

Current mechanical and electronic voting systems that do not involve physical alteration of ballot material by the voter do not provide for voter verification of the correctness of his or her own vote. Current voting systems that do involve physical alteration of ballot material by the voter to effect voting are subject to erroneous or incompetent handling by the voter. When such erroneous or incompetent handling by the voter occurs, the mechanical or electronic means for counting the votes on the ballot are affected, and the ballot may be rejected or the counting otherwise rendered inaccurate or suspect. The circumstance of ballot rejection or inconsistent mechanical tabulation in the case of erroneous or incompetent handling by the voter often requires manual examination of ballots, which is not only laborious and subject to its own inaccuracies, but is also inherently fraught with difficulty in maintaining the integrity of the election process. The principal object of the present invention is to provide a voter with a printed ballot prepared by a computer station and printer from input by the voter which completely and accurately presents the votes of the voter, and which is in a familiar form for easy review of his or her vote by the voter, so that machine and human error may be detected and corrected before the ballot is finally submitted by the voter for tabulation with the votes of other voters.

There is no prior art that this invention builds upon except its generic relationship to the well-known concept of electronic and mechanical voting machines, including those which produce a permanent paper record in addition to direct electronic and mechanical tabulation. However, there does not appear to be any prior art which combines accurate electronic or mechanical preparation of a printed ballot with an opportunity for review of the ballot by the voter and mechanical or electronic comparison of the printed ballot with the data stored from the voter input.

The present invention has elements that may be considered to be covered generally by class 235, particularly subclass 51 covering machines employed for casting and counting votes.

BRIEF SUMMARY OF THE INVENTION

The present invention is a voting system and method which provides for auto-verification, auto-verification meaning here the process by which the voter has the opportunity and the responsibility to verify that the ballot with which he or she votes shows the votes as he or she intended. The voting system also provides for correction of the votes of the voter by the voter if the election ballot produced by a computer voting station from his or her voting input does not show the votes as he or she intended, such correction being effected by repeating the voting process and producing another printed ballot. The present invention provides a voter with a printed ballot prepared by a computer voting station with a printer from input by the voter which accurately presents the votes of the voter in a familiar form, and which the voter than submits as his or her votes.

The present invention employs a computer voting station which is a computer to which a display, an input device, and a printer are connected, and which is running a computer program for directing the voting process for the voter and for vote counting. A ballot scanning machine which is capable of reading ballot selection markings, such as the filled-circle, filled-oval, or filled-rectangle types of voting markings, may also be connected to the voting station. The computer program for the voting system displays the ballot for voting together with instructions for voting and provides for input of votes by the voter. The voter votes by selecting his or her preference in candidates or issue positions by means of an input device recognized by the computer program, and the computer program temporarily stores such vote information in memory or on storage media. A printed ballot produced by the computer voting station which shows the votes of a voter is then presented to the voter and either compared by the voter, or by operation of the computer program for the voting system with a ballot scanning machine, the machine capable of reading ballot selections, with the votes of the voter temporarily stored in the computer. The result of the comparison is then judged acceptable or unaccceptable by the voter, in the case of comparison by the voter, or by the computer program for the voting system using the ballot scanning machine so that only printed ballots which show votes by the voter identical to the votes of the voter stored in the computer voting station will be accepted for final tabulation. Such final tabulation is then made by a tabulation machine for the precinct.

DETAILED DESCRIPTION OF THE INVENTION

The present invention is a voting system which provides for auto-verification, auto-verification meaning here the process by which the voter has the opportunity and the responsibility to verify that the printed ballot which he or she finally presents as his or her votes shows the votes he or she intended. The voting system also provides for correction of his or her vote if the printed ballot by which he or she voted is not as he or she intended, such a correction being effected by repeating the operation of the voting station in the voting process. Although the voting system which is the present invention is complete as the instrument by which an election process may be carried out, the voting process is ultimately founded upon the law which governs elections and the manner in which the voting system is managed and operated. Thus, there may be many variations in the process that will be effective and equivalent in the management and operation of the voting system which is the present invention that will produce an accurate count of votes which have been individually verified by the voters themselves.

The principle object of the present invention is to provide a voter with a printed ballot prepared by a voting station with a printer from input from the voter which accurately presents the vote of the voter, and which is in a familiar form for easy review by the voter, so that machine and human error may be detected and corrected before the ballot is submitted by the voter for tabulation with the votes of the other voters.

Figure 1:
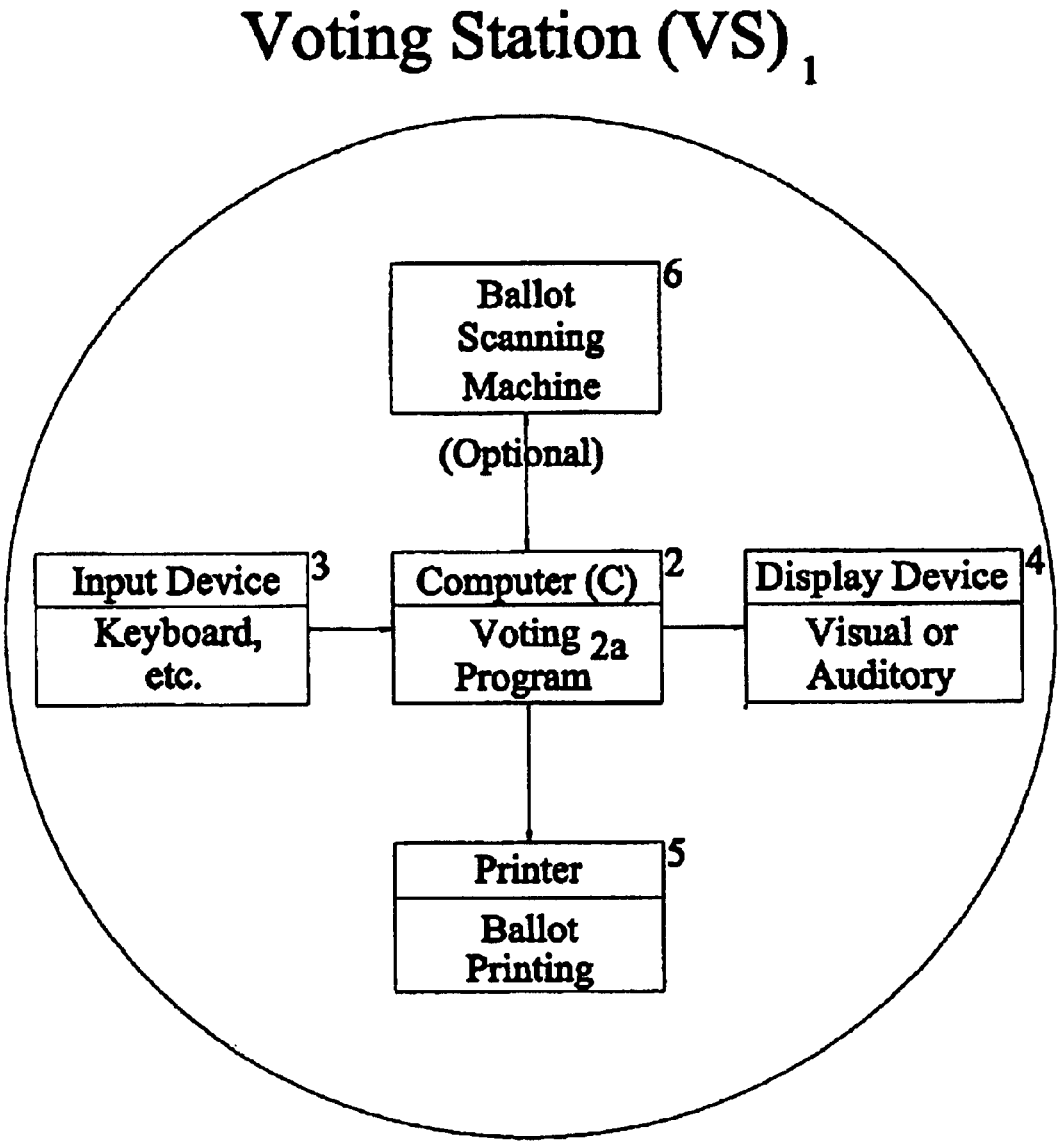
FIG. 1 is a block diagram of a voting station used in the voting system of the present invention.

The present invention is a voting system and method which, referring to FIG. 1, employs a computer voting station 1 which includes a computer 2 to which a display device 4, input device 3, and printer 5 are connected. The computer 2 may be a mainframe, a central computer with terminals, a standard personal computer, or a combination thereof. Such computers may be linked by local area networks 20, or networks linking several locations, or internet, with various types of direct connection, such as digital or acoustical telephonic, fibreoptic, satellite, or microwave. Such computers 2 may have internal memory, such as mainframes and personal computers, or may be terminals, with or without memory independent of the memory of the computer to which they are the operating interface. Such computers 2 may have data storage devices, such as fixed disk drives, or removably media drives, such as floppy drives, optical drives, bernoulli drives, or magnetic hard disk drives, all of which may be internal or external to the computer 2, depending on the hardware configurations selected. The display devices 4 referred to may include standard visual displays, such as computer cathode ray tube monitors, TFT displays, plasma displays, and liquid crystal displays, and auditory displays, such as speakers and earphones, connected to sound wave generating interfaces in the computer. The input device 3 may include a keyboard, standard or braille for vision impaired voters, a pointing device, such as a computer mouse or trackball, a touchscreen, joysticks, or buttons such as on a video game controller.

Figure 2:
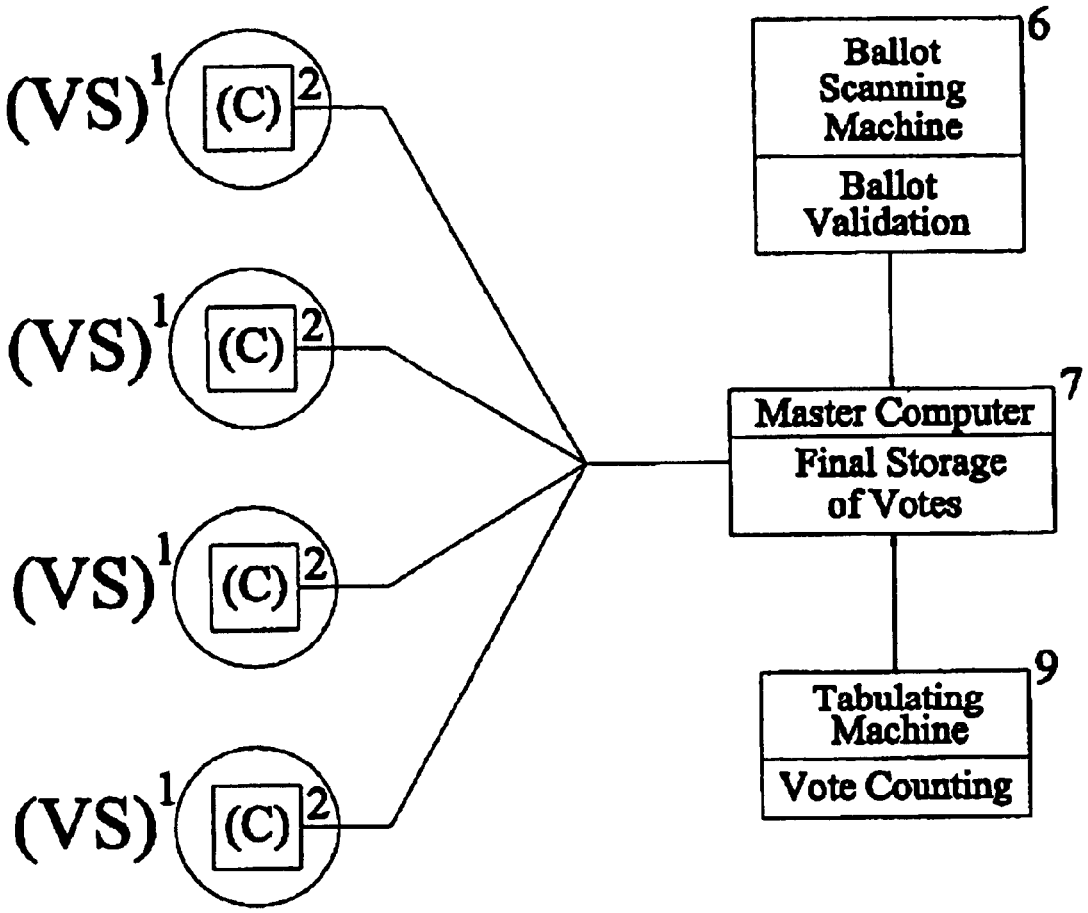
FIG. 2 is a block diagram of an example of a voting system configuration of the present invention.
Figure 3:
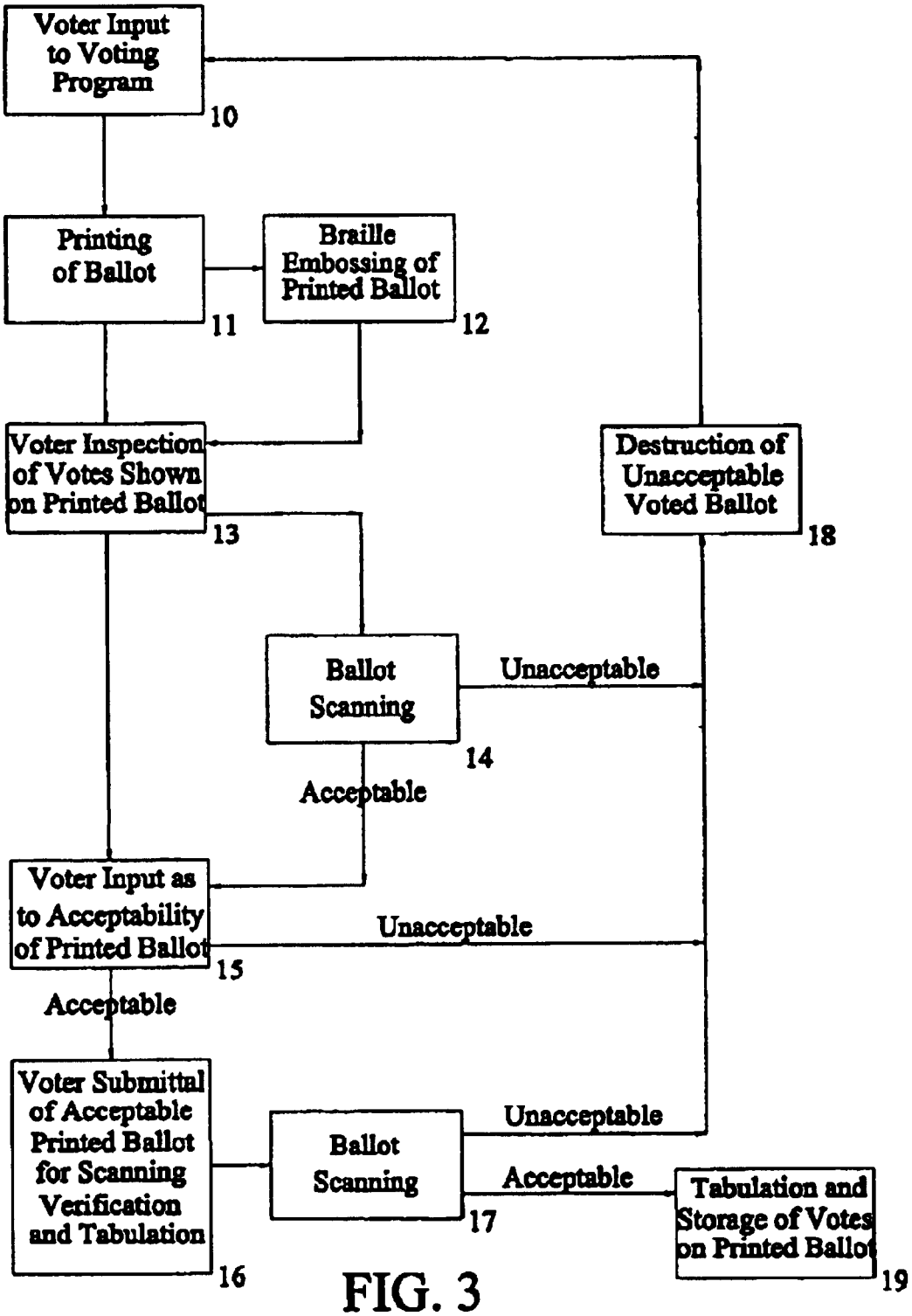
FIG. 3 is a diagram of the relation between the steps of the voting method using the voting system of the present invention.

In the example of the auto-verifying voting system schematically shown in FIG. 2, the system operates through individual voting stations 1 that include individual computers 2, such as personal computers, or terminals for a central computer, or a combination thereof, to each of which is connected a printer 5 with graphics capability. The preferred embodiment of the voting system would use a laser printer with a minimum resolution of 600 by 600 dots per inch, and which is capable of printing a paper ballot on which the selection of votes can be represented by filled-circles or other ballot selection markings, such as filled-ovals or filled-rectangles. Such a paper ballot should closely resemble the ballots normally published in advance of an election to inform the electorate of their choices and to create familiarity with the layout of the ballot. Also connected to the computer 2 in the voting station 1 may be a machine 6 which is capable of reading ballot selection markings previously described, either directly, through a master computer 7, or network 20 to which the computer 2 for the voting station 1 is connected. Such a machine will hereinafter be referred to as a "ballot scanning machine" 6 and is essentially an electro-optical sensing device from the well-known art. Such a ballot scanning machine 6 may be interfaced with the computer 2 in the voting station 1 to scan the paper ballot printed by the printer 5 as voted by the voter. The printed ballot produced by the computer voting station 1 which shows the votes of a voter presented to the voter may either be compared by the voter, or by operation of the computer program 2a for the voting system with a ballot scanning machine 6, the machine capable of reading ballot selection markings, or by both methods, with the votes of the voter temporarily stored in the computer 2. The vote stored in the computer 2 is either in memory or on disk, also by operation of the computer program 2a for the voting system running in the computer 2. The result of the comparison is then judged acceptable or unacceptable by the voter, in the case of comparison by the voter, or by the computer program 2a for the voting system, in the case of comparison with the ballot as read by the ballot scanning machine 6 in the voting station 1, which is the preferred embodiment, so that only printed ballots which show votes by the voter identical to the votes of the voter stored in the computer 2 for the voting station 1 will be accepted for final tabulation 19, as shown in the schematic illustration of the voting method in FIG. 3. However, again referring to FIG. 3 such a comparison may also be made visually or in braille 13 by the voter, without the use of a ballot scanning machine 6, resulting in a determination by the voter 15 of the acceptability of the printed ballot with the votes of the voter for final tabulation 19. Such final tabulation 19 may then be made by a tabulation machine 9 for the precinct (or other legally chosen voting subdivision) which, in a preferred embodiment, is one which has the same ballot scanning machine mechanism as the ballot scanning machine 6 which scanned the printed paper ballot for comparison 14 with the vote temporarily stored in the voting station 1 computer 2 memory.

The computer program 2a for the voting system may be running in a master computer 7 of which the voting stations 1 are terminals, or locally stored in each computer 2 for a voting station, which may be a stand-alone computer 2, depending on the hardware configuration chosen to implement the voting system. The computer program 2a by which the voting system is operated, running in the computer 2 for a voting station 1, functions to cause the computer 2 for a voting station 1 to display voting information and instructions to the voter, as well as instructions and information as to the operation of the voting system. Such voting instructions may be presented by the program 2a visually or audibly, with various options for languages other than English for selection by the voter, and may include practical and legal warnings about voting and the abuse of the voting right. The type of display device 4, visual or auditory, as would be necessary for voters whose sight was impaired, may be selected by the vector before commencing the operation of the voting station 1 by program 2a selection or by prior arrangement with election officials. Such a selection may be implemented by directing the voter to a voting station 1 specifically equipped for the selection, or by an opinion available in the computer program 2a in appropriately configured computer 2 voting stations 1.

The computer program 2a also displays the ballot for voting and provides for input of votes by the voter, the type of display device 4 again being selected in advance of commencing operation of the voting station. Again referring to FIG. 3, the voting method proceeds as the voter votes 10 by selecting his or her preference in candidates or issue positions by means of the input device 3 provided and recognized by the computer program 2a, and the computer program 2a temporarily stores such voting information in memory or on storage media. The computer program 2a may provide for review and correction of votes during the operation of the voting station 1 by the vector.

Upon or following temporary storage of the vote of the voter by the computer program 2a in the computer 2 for the voting station 1, the vote of the voter is then presented to the voter in the form of a paper ballot 11, 12 printed by the printer 5 for that voting station 1, the paper ballot being produced by the printer 5 in the printing process by the computer program 2a from the information concerning the vote of the voter stored in memory, such vote being represented on the printed ballot by filled-circles or other ballot selection markings related to the choices of the voter made upon voting. The printed ballot may be produced by the printer 5 by printing the votes of the voter on a pre-printed election ballot, or by printing the votes of the voter concurrently with the printing of the election ballot on the same paper as the election ballot is printed. The printed ballot may be embossed in braille directly by a braille printer for reading and verification by a sight-impaired voter 12, or translated and overprinted with the use of a machine using well-known technology for character recognition and braille printing. The voter then has an opportunity to examine the printed ballot for correctness with regard to the preferences expressed by his or her voting 13. If upon inspection of the printed ballot produced by the printer 5 for the voting station 1 used by the voter 13, the voter observes that the printed ballot correctly represents the votes of the voter 15, the ballot may be submitted by the voter 16 for processing to a ballot scanning machine 6 interfaced with that voting station 17. Such processing may proceed in the computer program 2a by comparison of the votes represented by ballot selection markings on the printed ballot with the votes stored in the computer 2 for the voting station 1. If the votes shown on the printed ballot are identical to the votes stored in the computer 2 for the voting station 1, the ballot is returned to the voter for presentation by the voter 16 for final tabulation 19 by one of the tabulating machines 9 for the voting precinct (or other legally chosen voting subdivision), and the vote data which was temporarily stored in the voting station 1 computer 2 is finally stored 19 for processing by the computer program 2a.

A ballot scanning machine 6 may also be programmed through the computer 2 for the voting station 1 to imprint the printed ballot with a validation marking or code which the tabulation machines 9 for the precinct require for acceptance of the printed ballot for tabulation. If the votes of the voter as shown on the printed ballot are not identical to the votes of the voter stored in the computer for the voting station 1 computer 2, the printed ballot presented to the voter may then be invalidated 14, 17, which may be evidenced by defacement or other treatment of the ballot, and the ballot may either be returned to the voter for reference, or destroyed 18. Such a ballot scanning machine 6 would in a preferred embodiment render such an invalidated ballot unacceptable by the tabulation machine 9 for the precinct, so that the votes on such an invalidated ballot could not be accepted as final votes for tabulation 19 with other votes. The vote information temporarily stored in the voting station 1 computer 2 would then be erased, and not stored for further processing with other final votes stored in the computer 2 for the voting station 1. Upon the occurrence of such an invalidation of a printed ballot the voting system would become subject to diagnostic review to determine the cause of the discrepancy, which may require the temporary closure of the system. If the hardware configuration permits, only the voting station 1 involved which produced the discrepancy would be shut down for diagnostic review, with the voter being directed to another voting station 1 to repeat the voting process.

The processing of the individual votes of the voters may include continuous tabulation 19 by inclusion of the vote of the voter in the total of votes cast in selection of the candidates or on the issue positions, database recording of the anonymous voting of each voter, real time read-out of voting information, and continuous comparison with the results of the vote counting by the tabulating machine 9 for the voting precinct. All of the voting activity of the computers 2 the voting stations 1, and the tabulations 19 by the voting precinct (or other legally chosen voting subdivision) may be recorded for later review. Such voting activity may also be monitored in real-time, so that if discrepancies appear between the tabulation of the votes cast as shown from the totals available from the computer program 2a for the voting stations 1 and the tabulation 19 of the votes cast by the tabulating machine 9 of the precinct, (or other legally chosen voting subdivision) those discrepancies may be brought to the attention of election officials, present to or removed from the precinct (or other legally chosen voting subdivision).

What we claim as our invention is:

1. A self-verifying voting system comprising:

one or more voting stations comprising:

(a) one or more computer programs which operate in a computer to display general voting instructions, at least one election ballot showing the candidates and issues to be voted on, and directions to the voter for operation of the system;

present the election ballot for voting and input of votes by the voter;

accept input of the votes from the voter;

print out the election ballot according to which the voter voted with the votes of the voter printed thereon, so that the votes of the voter are readable on said election ballot by the voter and readable by a tabulating machine;

record the votes in the computer; and compare the votes read by a ballot scanning machine with the votes recorded in the computer;

(b) a computer with at least one display device, at least one device to accept voting input from a voter, at least one data storage device, and sufficient memory to provide for the operation of said computer program in which said computer program runs;

(c) a printer connected to said computer for printing the election ballot according to which the voter voted;

(d) a ballot scanning means for reading the votes on the printed ballot printed according to the election ballot which the voter voted so that the votes shown on the printed ballot are compared by the computer program with the votes recorded in the computer for the voter;

(e) means for connecting said ballot scanning means to said computer; and a means for tabulating the printed ballots generated by said one or more voting stations.

2. The voting system of claim 1 wherein the computer is a standard personal computer.

3. The voting system of claim 1 wherein the display device is a visual display device.

4. The voting system of claim 1 wherein the display device is an auditory display device [such as a sound card] with speakers or earphones.

5. The voting system of claim 1 wherein the computer is a [standard personal] *central* computer *with terminals*.

6. The voting system of claim 1 wherein the computer is a standard personal computer which is connected to a local area network within the voting precinct.

7. The voting system of claim 1 wherein the election ballot presented is displayed in increments of each candidate or issue to be decided upon.

8. The voting system of claim 1 wherein the computer holds the recorded votes in memory until comparison of the printed ballot as read by [the] *a* tabulating machine with the votes recorded in memory confirms that such votes are identical.

9. The voting system of claim 1 wherein the computer program causes the votes to be recorded on said data storage device of the computer.

10. The voting system of claim 1 wherein one of said at least one input device is a pointing device.

11. The voting system of claim 1 wherein one of said at least one input device is a keyboard.

12. The voting system of claim 1 wherein one of said at least one input device is a touch-screen.

13. The voting system of claim 1 wherein one of said at least one of the data storage devices is a fixed disk.

14. The voting system of claim 1 wherein one of said at least one of the data storage devices is removable media.

15. The voting system of claim 1 wherein the [printer is a laser printer] *printed ballot closely resembles the ballot published in advance of the election*.

16. The voting system of claim 1 wherein the [computer station, at least one display device, and at least one input device, and the printer are in one machine case] *the printed ballot has the same appearance as the ballot published in advance of the election*.

17. The voting system of claim 1 further comprising at least one master tabulating machine for the precinct which reads the election ballot according to which the voter voted with printed indication of the votes of the voter printed thereon for tabulation of the voters votes.

18. The voting system of claim 1 wherein the master tabulating machine is connected to a master network for the political subdivision conducting the vote.

19. The voting system of claim 1 wherein the ballot scanning machine is equipped with a means for marking a voter verified ballot as validated.

20. The voting system of claim 1 wherein the ballot scanning machine is equipped with a means for marking a printed ballot as valid for counting by the means for tabulating the printed ballots.

21. The voting system of claim 1 wherein the ballot scanning machine is equipped with a means for marking a voter verified ballot as invalidated.

22. The voting system of claim 1 wherein the ballot scanning machine is equipped with a means for marking a printed ballot as invalid for counting by the means for tabulating the printed ballots.

23. The voting system of claim 1 wherein the means for tabulating the printed ballots generated by said one or more voting stations will accept only printed ballots which are validated by a ballot scanning machine.

24. The voting system of claim 1 further comprising a braille printer for embossing a printed ballot with a braille translation of the election ballot and the votes of the voter so that said printed balloon and the votes of the voter are readable in braille.

25. A self-verifying voting system comprising:

one or more voting stations comprising:

(a) one or more computer programs which operate in a computer to display general voting instructions, at least one election ballot showing the candidates and issues to be voted on, and directions to the voter for operation of the system;

present the election ballot for voting and input of votes by the voter;

accept input of the votes from the voter;

print out the election ballot according to which the voter voted with the votes of the voter printed thereon, so that the votes of the voter are readable on said election ballot by the voter and readable by a tabulating machine;

record the votes in the computer; and compare the votes read by a ballot scanning machine with the votes recorded in the computer;

(b) a computer with at least one display device, at least one input device, at least one data storage device, and sufficient memory to provide for the operation of said computer program in which said computer program runs;

(c) at least one computer terminal with at least one display device, and at least one device to accept voting input from a voter connected to said computer;

(d) a printer connected to said computer terminal for printing the election ballot according to which the voter voted;

(e) a ballot scanning means for reading the votes on the printed ballot printed according to the election ballot which the voter voted so that the votes shown on the printed ballot are compared by the computer program with the votes recorded in the computer for the voter;

(f) means for connecting said ballot scanning means to said computer; and a means for tabulating the printed ballots generated by said one or more voting stations.

26. The voting system of claim 25 wherein the computer is a standard personal computer.

27. The voting system of claim 25 wherein the display device is a visual display device.

28. The voting system of claim 25 wherein the display device is an auditory display device [such as a sound card] with speakers or earphones.

29. The voting system of claim 25 wherein the computer is a [standard personal] *central* computer *with terminals*.

30. The voting system of claim 25 wherein the computer is a standard personal computer which is connected to a local area network within [the] *a* voting precinct.

31. The voting system of claim 25 wherein the election ballot presented is displayed in increments of each candidate or issue to be decided upon.

32. The voting system of claim 25 wherein the computer holds the recorded votes in memory until comparison of the printed ballot as read by the tabulating machine with the votes recorded in memory confirms that such votes are identical.

33. The voting system of claim 25 wherein the computer program causes the votes to be recorded on said data storage device of the computer.

34. The voting system of claim 25 wherein one of said at least one input devices is a [graphical cursor] *pointing* device.

35. The voting system of claim 25 wherein one of said at least one input devices is a keyboard.

36. The voting system of claim 25 wherein one of said at least one input devices is a touch-screen.

37. The voting system of claim 25 wherein one of said at least one of the data storage devices is a fixed disk.

38. The voting system of claim 25 wherein one of said at least one of the data storage devices is removable media.

39. The voting system of claim 25 wherein the [printer is a laser printer] *printed ballot closely resembles the ballot published in advance of the election*.

40. The voting system of claim 25 wherein the computer [station], at least one display device, and at least one input device, and the printer are in one machine case.

41. The voting system of claim 25 further comprising at least one master tabulating machine for the precinct which reads the election ballot according to which the voter voted with printed indication of the votes of the voter printed thereon for tabulation of the voters votes.

42. The voting system of claim 25 wherein [the] *a* master tabulating machine is connected to a master network for the political subdivision conducting the vote.

43. The voting system of claim 25 wherein the ballot scanning machine is equipped with a means for marking a voter verified ballot as validated.

44. The voting system of claim 25 wherein the ballot scanning machine is equipped with a means for marking a printed ballot as valid for counting by the means for tabulating the printed ballots.

45. The voting system of claim 25 wherein the ballot scanning machine is equipped with a means for marking a voter verified ballot as invalidated.

46. The voting system of claim 25 wherein the ballot scanning machine is equipped with a means for marking a printed ballot as invalid for counting by the means for tabulating the printed ballots.

47. The voting system of claim 25 wherein the means for tabulating the printed ballots generated by said one or more voting stations will accept only printed ballots which are validated by a ballot scanning machine.

48. The voting system of claim 25 further comprising a braille printer for embossing a printed ballot with a braille translation of the election ballot and the votes of the voter so that said printed ballot and the votes of the voter are readable in braille.

49. A method of voting providing for self-verification of [the] *a* ballot comprising the steps of:

(a) voting by a vector using a computer voting station programmed to
present an election ballot,
accept input of votes from the vector according to the election ballot,
temporarily store the votes of the voter;

(b) printing of the votes of the voter from the votes temporarily stored in the computer for the voting station;

(c) comparison by the voter of the printed votes with the votes temporarily stored in the computer for the voting station;

(d) decision by the voter as to whether [the] *a* printed ballot is acceptable or unacceptable;

(e) inputting of information as to the acceptability of [the] *a* printed ballot by the voter; and (f) submission of [acceptable ballots] *an acceptable printed ballot* for tabulation.

50. The method of voting of claim 49 further comprising destruction of ballots which are unacceptable.

51. The method of voting of claim 49 wherein the printing of the votes of the voter is on a pre-printed election ballot[;].

52. The method of voting of claim 49 wherein the printing of the votes of the voter is concurrent with the printing of [the election] *a* ballot [and on the same paper as the election ballot is printed:] *which closely resembles the ballot published in advance of the election.*

53. The method of voting of claim 49 further comprising the tabulation of the votes of the voter with the other votes cast in [the] *a* voting precinct.

54. The method of voting of claim 49 further comprising [the] *a* final storage of the votes stored in the computer for the voting station for further processing.

55. The method of voting of claim 49 further comprising the comparison by the computer for the voting station of the votes of the voter temporarily stored in the computer for the voting station with the votes of the voter shown on the printed ballot which have *been* read to the computer by a ballot scanning machine.

*56. A self-verifying voting system comprising:*

*one or more voting stations comprising:*

*(a) one or more computer programs which operate in a computer to display general voting instructions, at least one election ballot showing the candidates and/or issues to be voted on, and directions to the voter for operation of the system;*
*present the election ballot for voting and input of votes by the voter;*
*accept input of the votes from the voter;*
*print out the election ballot according to which the voter voted with the votes of the voter printed thereon, so that the votes of the voter are readable on said election ballot by the voter and readable by a ballot scanning machine; and*
*record the votes in the computer;*

*(b) at least one computer with at least one display device, at least one device to accept voting input from a voter, and sufficient memory to provide for the operation of said computer program;*

*(c) a printer connected to said computer for printing the election according to which the voter voted;*

*(d) a ballot scanning machine for reading the votes on the printed ballot printed according to the election ballot which the voter voted and*

*a means for tabulating the printed ballots generated by said one or more voting stations.*

*57. The voting system of claim 56 wherein said at least one computer has at least one data storage device.*

*58. The voting system of claim 57 wherein said at least one data storage device is connected to said at least one computer through at least one terminal connected to said at least one computer.*

*59. The voting system of claim 56 wherein said at least one device to accept voting input from a voter is connected to said at least one computer through at least one terminal connected to said at least one computer.*

*60. The voting system of claim 56 wherein the ballot scanning machine is connected to a voting station so that the votes shown on the printed ballot are compared by the computer program with the votes recorded in the computer for the voter.*

*61. The voting system of claim 60 wherein said one or more computer programs compares the votes read by the ballot scanning machine with the votes recorded on the computer.*

*62. The voting system of claim 56 wherein the computer is a standard personal computer.*

*63. The voting system of claim 56 wherein the display device is a visual display device.*

*64. The voting system of claim 56 wherein the display device is an auditory display device with speakers or earphones.*

*65. The voting system of claim 56 wherein the computer is a central computer with terminals.*

*66. The voting system of claim 56 wherein the computer is a standard personal computer which is connected to a local area network within a voting precinct.*

*67. The voting system of claim 56 wherein the election ballot presented is displayed in increments of each candidate or issue to be decided upon.*

*68. The voting system of claim 56 wherein the computer holds the recorded votes in memory until comparison of the printed ballot as read by a tabulating machine with the votes recorded in memory confirms that such votes are identical.*

*69. The voting system of claim 56 wherein the computer program causes the votes to be recorded on a data storage device of the computer.*

*70. The voting system of claim 56 wherein one of said at least one input devices is a pointing device.*

*71. The voting system of claim 56 wherein one of said at least one input devices is a keyboard.*

*72. The voting system of claim 56 wherein one of said at least one input devices device is a touch-screen.*

*73. The voting system of claim 56 further comprising at least one data storage device.*

*74. The voting system of claim 56 wherein a data storage device is a fixed disk or removable media.*

*75. The voting system of claim 56 wherein the printer is a laser printer.*

*76. The voting system of claim 56 wherein the computer, at least one display device, and at least one input device, and the printer are in one machine case.*

*77. The voting system of claim 56 further comprising at least one master tabulating machine for a precinct which reads the election ballot according to which the voter voted with printed indication of the votes of the voter printed thereon for tabulation of the voters votes.*

*78. The voting system of claim 56 wherein a master tabulating machine is connected to a master network for* [the] a political subdivision conducting the vote.

*79. The voting system of claim 56 wherein the ballot scanning machine is equipped with a means for marking a voter verified ballot as validated.*

*80. The voting system of claim 56 wherein the ballot scanning machine is equipped with a means for marking a printed ballot as valid for counting by the means for tabulating the printed ballots.*

*81. The voting system of claim 56 wherein the ballot scanning machine is equipped with a means for marking a voter verified ballot as invalidated.*

*82. The voting system of claim 56 wherein the ballot scanning machine is equipped with a means for marking a printed ballot as invalid for counting by the means for tabulating the printed ballots.*

*83. The voting system of claim 56 wherein the means for tabulating the printed ballots generated by said one or more voting stations will accept only printed ballots which are validated by a ballot scanning machine.*

*84. The voting system of claim 56 further comprising a braille printer for embossing a printed ballot with a braille translation of the election ballot and the votes of the voter so that said printed ballot and the votes of the voter are readable in braille.*

*85. A method for voting providing for self-verification of a ballot comprising the steps of:*

*(a) voting by a voter using a computer voting station programmed to present an election ballot,*

*accept input of votes from the voter according to the election ballot,*

*temporarily store the votes of the voter;*

*(b) printing of the votes of the voter from the votes temporarily stored in the computer for the voting station;*

*(c) comparison by the voter of the printed votes with the votes temporarily stored in the computer for the voting station;*

*(d) decision by the voter as to whether a printed ballot is acceptable or unacceptable; and*

*(e) submission of an acceptable printed ballot for tabulation.*

*86. The method of voting of claim 85 further comprising inputting of information as to the acceptability of the printed ballot by the voter prior to submission of acceptable ballots for tabulation.*

*87. The method of voting of claim 85 further comprising destruction of ballots which are unacceptable.*

*88. The method of voting of claim 85 wherein the printing of the votes of the voter is on a pre-printed election ballot.*

*89. The method of voting of claim 85 wherein the printing of the votes of the voter is concurrent with the printing of the election ballot and on the same paper as the election ballot is printer.*

*90. The method of voting of claim 85 further comprising a tabulation of the votes of the voter with the other votes cast in the voting precinct.*

*91. The method of voting of claim 85 further comprising a final storage of the votes stored in the computer for the voting station for further processing.*

*92. The method of voting of claim 85 further comprising the comparison by the computer for the voting station of the votes of the voter temporarily stored in the computer for the voting station with the votes of the voter shown on the printed ballot which have been read to the computer by a ballot scanning machine.*

*93. A self-verifying voting method comprising the steps of:*

*(a) voting by a voter using a computer voting station programmed to present an election ballot,*

*accept input of votes from the voter according to the election ballot,*

*store the votes of the voter;*

*(b) printing of the votes of the voter from the votes stored in the computer for the voting station;*

*(c) examination by the voter of the printed votes for correctness and comparison with the votes the voter input;*

*(d) decision by the voter as to whether the printed votes are acceptable or unacceptable;*

*(e) recording of the acceptable votes stored in the computer;*

*(f) submission of the acceptable printed votes; and*

*(g) tabulation of the acceptable recorded and/or acceptable printed votes.*

*94. A self-verifying voting system comprising:*

*one or more voting stations comprising:*

*(a) at least one computer with at least one display device, at least one device to accept voting input from a voter, and sufficient memory to provide for the operation of one or more computer programs;*

*(b) a printer connected to said computer for printing the votes of the votor;*

*(c) one or more computer programs which operate in a computer to:*

*present the election ballot for voting;*

*accept input of the votes from the voter;*

*store the votes of the voter in the computer;*

*print the votes of the voter so that the votes of the voter are readable by the voter and comparable by the voter with the votes the voter input;*

*accept input of the voter as to whether the printed votes are acceptable or unacceptable; and*

*record the votes stored in the computer which are acceptable; and*

*a means for tabulating the acceptable votes of the voter recorded and/or printed in said one or more voting stations.*

* * * * *

UNITED STATES PATENT AND TRADEMARK OFFICE

CERTIFICATE OF CORRECTION

PATENT NO. : RE 40,449 E
APPLICATION NO. : 11/062351
DATED : August 5, 2008
INVENTOR(S) : Anthony I. Provitola It is certified that error appears in the above-identified patent and that said Letters Patent is hereby corrected as shown below:

In column 4, line 46 of the Patent delete “vector” and insert --voter-- in its place.

In column 4, line 64 of the Patent delete “vector” and insert --voter-- in its place.

In Claim 49, column 9, line 36 of the Patent delete “vector” and insert --voter-- in its place.

In Claim 49, column 9, line 36 of the Patent delete “vector” and insert --voter-- in its place.

Signed and Sealed this

Seventh Day of July, 2009

John Doll

JOHN DOLL
*Acting Director of the United States Patent and Trademark Office*